US009809004B2

(12) United States Patent
Nowak et al.

(10) Patent No.: US 9,809,004 B2
(45) Date of Patent: Nov. 7, 2017

(54) BREATHABLE PROTECTIVE APPAREL

(71) Applicant: E I DU PONT DE NEMOURS AND COMPANY, Wilmington, DE (US)

(72) Inventors: Stephane Nowak, Thionville (FR); Serge Rebouillat, Echenevex (FR)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 212 days.

(21) Appl. No.: 14/797,530

(22) Filed: Jul. 13, 2015

(65) Prior Publication Data
US 2016/0016385 A1  Jan. 21, 2016

Related U.S. Application Data

(60) Provisional application No. 62/026,115, filed on Jul. 18, 2014.

(51) Int. Cl.
| B32B 27/20 | (2006.01) |
| B32B 27/12 | (2006.01) |
| B32B 7/14 | (2006.01) |
| B32B 5/02 | (2006.01) |
| B32B 7/04 | (2006.01) |
| B32B 27/32 | (2006.01) |

(52) U.S. Cl.
CPC ........... *B32B 7/14* (2013.01); *B32B 5/022* (2013.01); *B32B 7/045* (2013.01); *B32B 27/12* (2013.01); *B32B 27/20* (2013.01); *B32B 27/32* (2013.01); *B32B 2262/0253* (2013.01); *B32B 2262/106* (2013.01); *B32B 2264/108* (2013.01); *B32B 2305/026* (2013.01); *B32B 2307/54* (2013.01); *B32B 2307/718* (2013.01); *B32B 2307/724* (2013.01); *B32B 2307/7265* (2013.01); *B32B 2437/00* (2013.01); *B32B 2439/00* (2013.01); *B32B 2571/00* (2013.01)

(58) Field of Classification Search
USPC .............. 442/394, 398; 428/304.4, 315.5
See application file for complete search history.

(56) References Cited

U.S. PATENT DOCUMENTS

| 3,081,519 | A | 3/1963 | Blades et al. |
| 3,227,794 | A | 1/1966 | Anderson et al. |
| 3,427,376 | A | 2/1969 | Demsey |
| 3,532,589 | A | 10/1970 | David |
| 3,860,369 | A | 1/1975 | Brethauer et al. |
| 4,350,655 | A | 9/1982 | Hoge |
| 4,472,328 | A | 9/1984 | Sugimoto et al. |
| 4,777,073 | A | 10/1988 | Sheth |
| 5,294,258 | A | 3/1994 | Jarrell et al. |

(Continued)

FOREIGN PATENT DOCUMENTS

| WO | WO03/106543 | 12/2003 |
| WO | WO2009/065092 | 5/2009 |

OTHER PUBLICATIONS

PCT International Search Report and Written opinion for International Application No. PCT/US2015/040573 dated Sep. 4, 2015.

*Primary Examiner* — Matthew Matzek

(57) ABSTRACT

A laminated structure containing a microporous film bonded in a face to face relationship with a plexifilamentary nonwoven web with an adhesive layer situated in contact with a least a portion of both the microporous film and the nonwoven web. The adhesive may contain reactive tracers.

6 Claims, 1 Drawing Sheet

(56) References Cited

U.S. PATENT DOCUMENTS

| | | |
|---|---|---|
| 5,739,205 A | 4/1998 | Nishino |
| 5,750,444 A | 5/1998 | Jarrell et al. |
| 5,972,147 A | 10/1999 | Janis |
| 2002/0094742 A1 | 7/2002 | Jones et al. |
| 2003/0032355 A1* | 2/2003 | Guckert ............... A47G 9/0238 442/327 |
| 2004/0004196 A1 | 1/2004 | Demeo et al. |
| 2006/0147698 A1* | 7/2006 | Carroll ............... A41D 31/0016 428/316.6 |
| 2008/0166633 A1 | 7/2008 | Jones et al. |
| 2010/0272898 A1 | 10/2010 | Chen et al. |

* cited by examiner

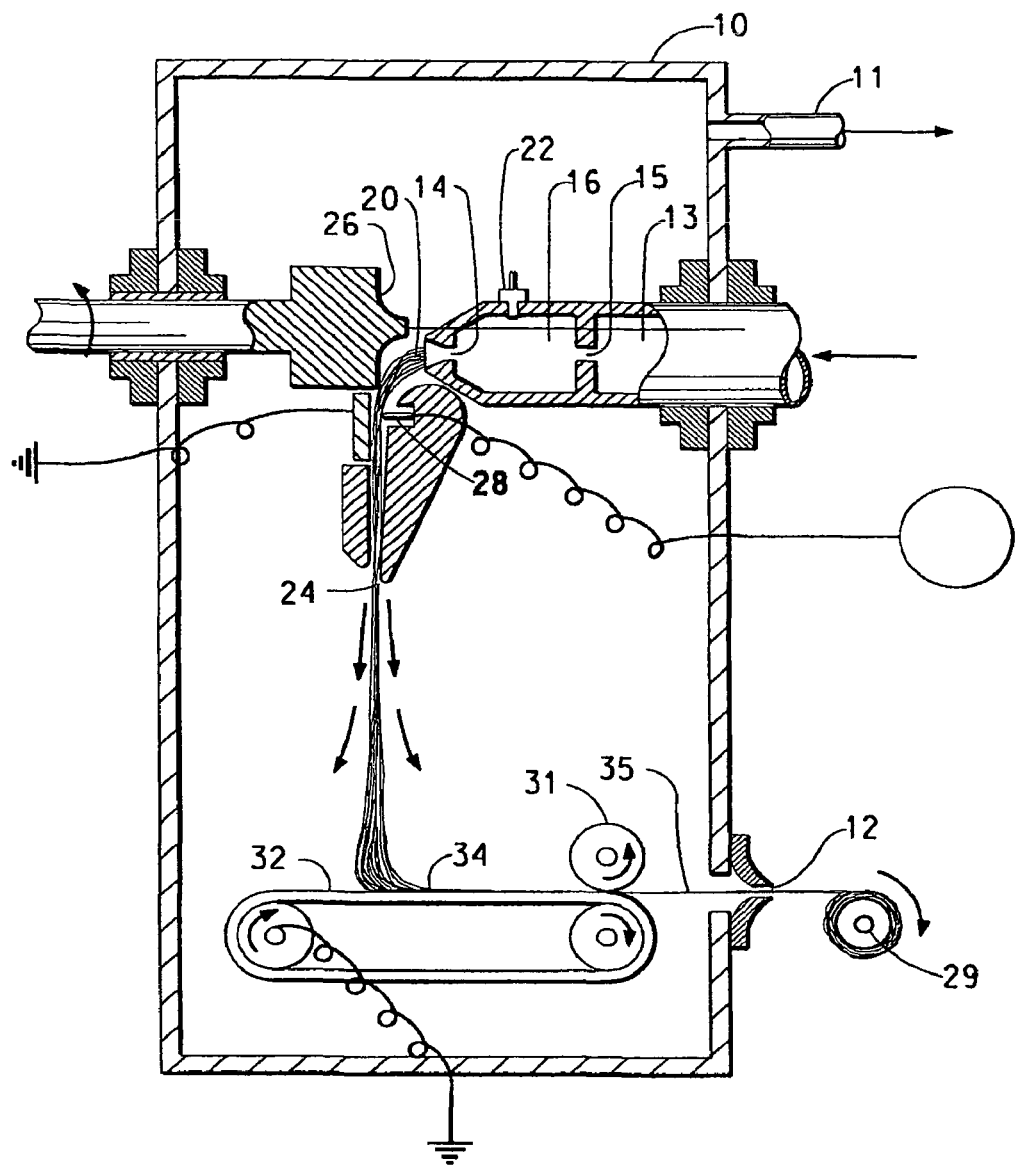

BREATHABLE PROTECTIVE APPAREL

FIELD OF THE INVENTION

The present invention relates to breathable protective apparel.

BACKGROUND

According to the EU directive 2000/54EC on Biological Substances, employers are obliged to make suitable protective clothing available to their employees. According to EN 14126, in order to protect against bacteria, viruses and other micro-organisms, special requirements are defined for the clothing materials used to protect against infectious agents. These materials must protect the skin, and therefore the wearer, against possible contact with biological substances and prevent the spread of germs. Suits with overtaped seams are recommended, since viruses, bacteria and spores are small enough to penetrate through the openings of sewn seams. Protective suits made of EN 14126 compliant materials can be identified by a biohazard pictogram. On the basis of the standard, the protective garment should be certified as Type 3 chemical protective clothing.

Type 3 garments should be able to provide protection against pressurized liquid chemicals. Some attempts have been made with composite materials but are too expensive. The current situation is that there is no breathable Type 3 garment on the market. The objective of the present invention is to provide a breathable Type 3 Category III protective apparel.

SUMMARY OF THE INVENTION

A laminated structure comprising a microporous film bonded in a face to face relationship with a plexifilamentary nonwoven web with an adhesive layer situated in contact with a least a portion of both the microporous film and the nonwoven web.

The film contains fillers in an amount between 30% and 50% by weight of the total film weight, and between 40 and 90% of polyolefin polymer by weight of the total film weight. The film has a thickness of between 12 and 25 microns. The film is bonded to the plexifilamentary web by adhesive.

The laminated structure further has a water vapor transmission rate (WVTR) as measured by the EN ISO 12572 Climate C method of greater than or equal to 1000 g/m²·day. The structure may also have a water vapor resistance as measured by the EN 31092 (ISO 11092) method below 40 m²·Pa/W.

The basis weight of the laminated structure is at least 55 grams per square meter (g/m²).

The tensile strength of the laminated structure according to EN ISO 13934-1 is at least 30 Newtons, preferably 45 Newtons most preferably 60 Newtons (N) in the machine direction.

The tensile elongation of the laminated structure according to EN ISO 13934-1 is at least 8% in the machine direction.

The tensile strength of the laminated structure according to EN ISO 13934-1 is at least 30 N, preferably 45 N most preferably 60 N in the cross direction.

The tensile elongation according to EN ISO 13934-1 is at least 15% in the cross direction, and The laminated structure has a hydrohead according to EN 20811 of at least 200 cm water.

In a further embodiment the film contains fillers in an amount between 35% and 45% by weight of the total film weight, and between 40% and 90%% of polyolefin polymer by weight of the total film weight.

In a still further embodiment the film is bonded to the plexifilamentary web by adhesive at multiple discrete points on the plexifilamentary web. In a further embodiment the laminated structure has been manufactured in a process where the adhesive is applied in discrete points as a hot melt.

In a still further embodiment, the adhesive is applied via a Porous Coat System.

The film may be dot-coated-glued to the plexifilamentary web with one or more adhesives comprising carbon based powders, micro-powders, nanotubes and carbon fiber fragment components, or any combination thereof.

The polyolefin polymer may be selected from the group consisting of low density polyethylene (LDPE), linear low density polyethylene (LLDPE), high density polyethylene (HDPE), polypropylene (PP), and any combination thereof.

The filler may be selected from the group consisting of calcium carbonate, clay, titanium dioxide, barium sulfate and any combination thereof.

The film may have a thickness of between 12 and 25 microns.

The film may be bonded to the plexifilamentary web by adhesive where the adhesive is applied in discrete points as a hot melt.

The adhesive may be applied by using a lamination process such that the breathability of the combined structure is not below 30% of the breathability of most breathable components.

In further embodiment the invention is directed to a multilayered structure or a garment that includes any embodiment above of the laminated structure of the invention.

BRIEF DESCRIPTION OF THE DRAWINGS

FIG. 1 shows a schematic, not to scale, cross sectional view of a spin cell illustrating a process for making flash-spun plexifilamentary sheets.

DETAILED DESCRIPTION OF THE INVENTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The term "polymer" as used herein, generally includes but is not limited to, homopolymers, copolymers (such as for example, block, graft, random and alternating copolymers), terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "polyethylene" as used herein is intended to encompass not only homopolymers of ethylene, but also copolymers wherein at least 85% of the recurring units are ethylene units.

"Polyolefin polymer" refers to a polymer selected from the group consisting of low density polyethylene (LDPE), linear low density polyethylene (LLDPE), high density polyethylene (HDPE), polypropylene (PP), and any combination thereof. Polyolefin polymers may be manufactured using metallocene catalysts.

The term "nonwoven fabric, sheet or web" as used herein means a structure of individual fibers or threads that are positioned in a random manner to form a planar material without an identifiable pattern, such a pattern, for example, as would be seen in a knitted fabric. Individual fibers that may organize themselves locally in some preferential ways or directions are still considered as positioned in a random manner for the purposes of this definition.

As used herein, the "machine direction" is the long direction within the plane of a sheet, i.e., the direction in which the sheet is produced. The "cross direction" is the direction within the plane of the sheet that is perpendicular to the machine direction.

The term "unitary fibrous sheet" as used herein, means woven or nonwoven fabrics or sheets made of the same types of fibers or fiber blends throughout the structure, wherein the fibers form a substantially homogeneous layer that is free of distinguishable laminations or other support structures.

The term "plexifilamentary" as used herein, means a three-dimensional integral network of a multitude of thin, ribbon-like, film-fibril elements of random length and with a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

The term "spin fluid" refers to the total composition that is spun using the spinning apparatus described herein. Spin fluid includes polymer and spin agent.

The term "spin agent" refers to the solvent or mixture of solvents and any additives, solubility aids and blends therewith that is used to initially dissolve the polymer to form the spin fluid.

By "multilayered structure" or "laminated structure" is meant a composite structure that contains layers of distinct materials layered and bonded in a face to face arrangement over at least a portion of their faces. In one embodiment the multilayered structure of the invention is directed to a multiplicity of two or more sheets wherein at least one sheet is a polyethylene sheet comprising any plexifilamentary structure as described herein.

"Calendering" is the process of passing a web through a nip between two rolls. The rolls may be in contact with each other, or there may be a fixed or variable gap between the roll surfaces. An "unpatterned" roll is one which has a smooth surface within the capability of the process used to manufacture them. There are no points or patterns to deliberately produce a pattern on the web as it passed through the nip, unlike a point bonding roll.

The terms "glue" and "gluing" are synonymous as used herein with "adhesive" and "adhering" respectively.

Embodiments of the Invention

In one embodiment, the invention can be a composite web, made from a plexifilamentary web with one or more plexifilamentary layers in combination with a microporous membrane. Preferably the combination of membrane and web is made by adhesively laminating the plexifilamentary web to the membrane where the adhesive is applied by using a lamination process such that the breathability of the combined structure is not below 30% of the breathability of the most breathable components.

The membrane and plexifilamentary webs may be dot-coated-glued. In a further embodiment the layers may be glued according to a "Porous Coat System" of U.S. Pat. No. 5,750,444 and U.S. Pat. No. 5,294,258 to Nordson (Norcross, Ga.) which is designed to apply discrete, random and open patterns of hot melt adhesive to substrates, thereby ensuring minimal disruption to the laminate permeability as a result of the gluing process.

In summary, the porous coating system entails a method for coating a moving web with fluid material. A slot the may be used to dispense viscous hot melt adhesive in a fibrous or porous adhesive matrix by means of metering pumps feeding independently and separately controlled die slot supplying lands with hot melt adhesive only in an amount sufficient to produce a fibrous web or other porous adhesive pattern or matrix (as compared to a thin impervious adhesive film). This adhesive pattern or matrix is contact coated onto a first textile web uniformly coating a contact area thereof. Thereafter, the coated textile web may be used as is (where anti-skid or fabric thread locking features are desired), but also can be laminated to a second porous textile web via a heated laminating roll. This matrix deposition and laminating process produces a breathable, multiple layer composite which is fully adhered, resistant to high temperatures such as incurred in ironing processes, and has good flexibility and good hand.

In one embodiment the adhesive may contain a reactive tracer such as carbon based powders, micro-powders, nanotubes and carbon fiber fragment components, activated or combinations thereof.

It has been found beneficial to further engineer the dotting patterns to enable the reading of codes encrypted in the dot composition and/or readable according to the dots positioning respective to one another. The conductive nature of carbon matter makes the decoding simpler.

For example, dot clustering according to circle geometry containing various dot sizes and dot densities can be used for material identification per se, while triangular geometry may be used for safety and security coding aspects. Code bar dotting arrangements can also be added. Tracers including reactive tracers such as entities exhibiting electrochemical activity can be integrated in the dot composition, structure and/or arrangements and/or in the adhesive layer.

It is for example well recognized that oxygen and carbon dioxide are determining factors in the ageing and freshness preservation of certain goods such as food and medical formulations. Therefore if the laminate of the invention is used for the wrapping of such perishable goods one may want to trace the exposure of the goods to those gas entities via the tracing of the flux of gasses trough the laminates. In case of the use of the laminate of the invention to make garments, one may need to trace back the use of the garment from its exposure to certain gas entities during its usage. Additionally other information, such as identity preservation and origin of the garment may be trace back via tracers embedding in the previously described dots.

Therefore the knowledge of the flux of those gasses is also valuable information to determine any ageing effect or simply to make recommendation regarding the best use of the membrane assembly, based on a good knowledge of the occurred deduced operation time using the embedded reactive tracers.

Metals, metal oxides, transition metals, metal clusters were found efficient for the reactive tracing purpose described above.

Preferably, Ni (nickel), Pt (platinum), Pd (palladium), Co (cobalt), Mn (manganese) Cu (copper), Ag (silver), Al (aluminium), Fe (iron), and their oxide derivatives, in various chemical forms, were especially found suitable as reactive tracers for that purpose. For example both $CO_2$ and $O_2$ tracing was performing well using those entities and their related chemical families.

Organic compounds such as hydroquinones, PVP (polyvinylpyrrolidones), preferably hydrophobized PVP, exhibiting electro-activity, typically but not limited to oxidation-reduction electron transfer, as well as metal-organic blends we also found suitable reactive tracers.

Organometallic complexes, such as, tetrakis-methoxyphenyl-porphyrinato cobalt (CoTMPP), cobalt and copper phthalocyanines, copper-butyl phthalocyanine are also suitable reactive tracers.

Generally speaking reactive tracers cited above, as a matter of illustration, are for most of them electrochemically active tracers involving electrochemical reactions. Their embedment in a carbon containing medium facilitates the measurement of the evolution of their properties by electrochemical means; properties that can be related to ageing, exposure, identity and the likes.

Alternatively the adhesive may be applied by Uniform Fiber Deposition, which consists of a uniform and steady deposition of thousands of continuous adhesive filaments onto the substrate surface, maintaining most of its original mechanical properties unaltered.

Sheet Manufacture

The process for making flash-spun plexifilamentary sheets, and specifically Tyvek® spunbonded olefin sheet material, was first described in U.S. Pat. No. 3,081,519 to Blades et al, (assigned to DuPont.) The '519 patent describes a process wherein a solution of fiber-forming polymer in a liquid spin agent that is not a solvent for the polymer below the liquid's normal boiling point, at a temperature above the normal boiling point of the liquid, and at autogenous pressure or greater, is spun into a zone of lower temperature and substantially lower pressure to generate plexifilamentary film-fibril strands. As disclosed in U.S. Pat. No. 3,227,794 to Anderson et al. (assigned to DuPont), plexifilamentary film-fibril strands are best obtained using the process disclosed in Blades et al. when the pressure of the polymer and spin agent solution is reduced slightly in a letdown chamber just prior to flash-spinning.

The general flash-spinning apparatus chosen for illustration of the present invention is similar to that disclosed in U.S. Pat. No. 3,860,369 to Brethauer et al., which is hereby incorporated by reference. A system and process for flash-spinning a fiber-forming polymer is fully described in U.S. Pat. No. 3,860,369, and is shown in FIG. 1. The flash-spinning process is normally conducted in a chamber 10, sometimes referred to as a spin cell, which has a spin agent removal port 11 and an opening 12 through which non-woven sheet material produced in the process is removed. A spin fluid, comprising a mixture of polymer and spin agent, is provided through a pressurized supply conduit 13 to a spinning orifice 14. The spin fluid passes from supply conduit 13 to a chamber 16 through a chamber opening 15. In certain spinning applications, chamber 16 may act as a pressure letdown chamber wherein a reduction in pressure causes phase separation of the spin fluid, as is disclosed in U.S. Pat. No. 3,227,794 to Anderson et al. A pressure sensor 22 may be provided for monitoring the pressure in the chamber 16.

The spin fluid in chamber 16 next passes through spin orifice 14. It is believed that passage of the pressurized polymer and spin agent from the chamber 16 into the spin orifice generates an extensional flow near the approach of the orifice that helps to orient the polymer. When polymer and spin agent discharge from the orifice, the spin agent rapidly expands as a gas and leaves behind fibrillated plexifilamentary film-fibrils. The gas exits the chamber 10 through the port 11. Preferably, the gaseous spin agent is condensed for reuse in the spin fluid.

The polymer strand 20 discharged from the spin orifice 14 is conventionally directed against a rotating deflector baffle 26. The rotating baffle 26 spreads the strand 20 into a more planar structure 24 that the baffle alternately directs to the left and right. As the spread fiber strand descends from the baffle, the fiber strand is electrostatically charged so as to hold the fiber strand in a spread open configuration until the fiber strand 24 reaches a moving belt 32. The fiber strand 24 deposits on the belt 32 to form a batt 34. The belt is grounded to help ensure proper pinning of the charged fiber strand 24 on the belt. The fibrous batt 34 may be passed under a roller 31 that compresses the batt into a lightly consolidated sheet 35 formed with plexifilamentary film-fibril networks oriented in an overlapping multi-directional configuration. The sheet 35 exits the spin chamber 10 through the outlet 12 before being collected on a sheet collection roll 29.

A "thermally consolidated" or "thermally bonded" sheet is a sheet made by thermal consolidation of a web of the invention. Some examples of thermal bonding processes are through gas bonding, steam entanglement, ultra-sonic bonding, stretched bonding, hot calendaring, hot roll embossing, hot surface bonding.

Thermal surface bonding can be performed by a process as described in U.S. Pat. No. 3,532,589 to David for hard bonded surfaces. In this process the plexifilamentary sheet passes subsequently over a heated drum—cooling drum—heating drum—cooling drum to bond both sides of the material. The heating drum has the purpose to partly melt the plexifilamentary web to induce the bonding of the fibers. The cooling drum has the purpose to reduce the temperature to a value where the sheet will not shrink nor distort when unrestrained. During the bonding process the sheet is slightly compressed in order to have a controlled shrinkage.

Alternatively, the plexifilamentary sheet may be bonded by means of embossing rolls and rubber coated back-up roll to bond one or two sides of the sheet. The embossing roll can be smooth or contain different patterns, for example, but not limited to a linen pattern, rib pattern (for example described in US20030032355A1), random pattern. Before and after the pairs of embossing and back-up rolls the sheet may be in contact with pre-heat or cooling rolls as described in U.S. Pat. No. 5,972,147. After the bonding process the material may be softened through a button breaking device as described in U.S. Pat. No. 3,427,376 to Dempsey.

Microporous Membrane

Examples of the membrane may include various microporous films such as stretched, filled and can be used without limitation so long as a plexifilamentary layer can be added on the substrate.

Techniques for the preparation of microporous films from highly filled polymers, usually polyolefins, are known. Such webs are also suitable for use as the membrane of the invention. Typically a combination of a polyolefin, usually a polyethylene, is compounded with a filler, usually $CaCO_3$, and extruded and stretched into a film to form a microporous film.

Suitable examples of microporous films for use as the membrane of the present invention include those described in U.S. Pat. Nos. 4,472,328, 4,350,655 and 4,777,073 all of which are incorporated herein by reference.

The microporous membrane and plexifilamentary web are bonded to each other by adhesive bonding.

In a preferred embodiment, the membrane is bonded to the plexifilamentary web, for example, using a suitable lamination technique, such as passing the materials through a hot roll nip at a temperature sufficient to melt adhesive that has been applied to the membrane or plexifilamentary web. One of the rolls can have a raised pattern on its surface in order to produce a bonding pattern in the laminate.

One or more adhesives may be used to bond the plexifilamentary web and microporous membrane or the laminate to the inner or outer fabrics. One suitable adhesive is a thermoplastic adhesive, which can be softened upon heating, then hardened upon cooling over a number of heating and cooling cycles. An example of such a thermoplastic adhesive would be a "hot melt" adhesive.

Different methods of coating the plexifilamentary web or membrane with adhesive before lamination can be used. For example the plexifilamentary web can be first coated in the required areas with adhesive and then the membrane is placed onto the adhesive side of the coated fabric. Conductive heat and ample pressure are applied to the membrane side to cause the adhesive to flow into the membrane pores. If the adhesive is cross-linkable, the adhesive cross-links due to the heat and results in a mechanical attachment of the membrane to the substrate.

The heat and pressure of the method by which the layers are brought together (e.g., coextrusion or lamination) may be sufficient to provide adequate adhesion between the layers. However, it may be desirable to further treat the resulting multi-layer article, for example with additional heat, pressure, or both, to provide further adhesive bond strength between the layers. One way of supplying additional heat when the multi-layer article prepared by extrusion is by delaying the cooling of the laminate after co-extrusion. Alternatively, additional heat energy may be added to the multi-layer article by laminating or coextruding the layers at a temperature higher than necessary for merely processing the several components. Or, as another alternative, the finished laminate may be held at an elevated temperature for an extended period of time. For example the finished multi-layer article may be placed in a separate means for elevating the temperature of the article, such as an oven or heated liquid bath. A combination of these methods may also be used.

Test Methods

Hydrostatic Head (or hydrohead) is a measure of the resistance of the sheet to penetration by liquid water under a static load. A 7 inch×7 inch (17.78 cm×17.78 cm) sample is mounted in a SDL 18 Shirley Hydrostatic Head Tester (manufactured by Shirley Developments Limited, Stockport, England). Water is pumped against one side of a 102.6 cm section of the sample which is supported by a 30 mesh scrim with wires having a diameter of about 0.28 mm at a rate of 80+/−3 cm/min until three areas of the sample are penetrated by the water. The hydrostatic pressure is measured in inches, converted to SI units and given in centimeters of static water head. The test generally follows EN 20811

Film thickness is measured by according to the requirements of the DIN EN ISO 20534 norm.

Film basis weight is measured by according to the requirements of the DIN EN ISO 536 norm.

Tensile strength was measured by according to the requirements of the EN ISO 13934-1 norm. A strip of 50 mm width and 200 mm length is stretched until rupture with a rate of extension of 100 mm/min.

Moisture Vapor Transmission Rate (g/m2·day) was measured using DIN EN ISO 12572 Climate C. The Moisture Vapor Transmission rate measured using the EN ISO 12572 Climate C method is equivalent to Procedure B of the ASTM E96. The cup is filled with water and then covered with the sample.

The conditions were the following:
Relative humidity: 50%
Temperature: 23° C.
Air velocity: 2.50 m/s
Surface area of the sample: 50 cm2
Initial weight of water in the cup: 68 g The most important distinctive criteria to illustrate the invention is the breathability which can either be comparable to current offering but with higher liquid protection or better breathability for the same protection vis a vis liquids. Four commercial offerings were compared to the preferred product of the invention.

EXAMPLES

Where the type of test that a garment would pass is referred to below, Type 3 refers to a jet (of fluid) test, EN ISO 17491-3. Type 4 is a less severe spray test EN ISO 17491-4 (Method B).

Example 1

A laminated structure was prepared comprising a microporous film FPS-K16H or FPS-C15H available at Clopay Aschersleben GmbH bonded in a face to face relationship with a plexifilamentary HDPE nonwoven web with an H4256 adhesive layer available at Bostik SA situated in contact with a least a portion of both the microporous film and the nonwoven web.

The film had a thickness of between 15 microns. The film was bonded to the plexifilamentary web by adhesive applied via a Porous Coat System, as per the Nordson process.

The properties of the example are summarized in table 1 below.

TABLE 1

| Test | Result | Unit |
| --- | --- | --- |
| Basis weight of laminate | 59 | g/m$^2$ |
| Thickness of laminate | 170 | microns |
| MD Tensile | 89 | N |
| CD Tensile | 69 | N |
| Hydrostatic Head | >300* | cm of water |
| Moisture Vapor Transmission Rate | 1193 | g/m$^2$ · day. |

(* Here and elsewhere, the MVTR was limited to 300 or less because of the limitations of the testing equipment. A result above 300 is shown as >300.)

Above MD is the machine direction and CD is the cross direction of the material.

The breathability of the example was also measured according to EN 31092/ISO 11092, which typically provides the measurement procedure to assess the Ret, the resistance to evaporative heat loss through the sample which is expressed in $m^2 \cdot Pa/W$. The breathability of TY8 was 29 $m^2 \cdot Pa/W$. Hohenstein Comfort Rating System indicates that breathable fabrics are the ones with a Ret below 30 $m^2 \cdot Pa/W$.

The breathability of the material is also demonstrated by the medium MVTR value of 1193 g/m2·day of water vapor going through the fabric.

The comfort of the example product was comforted by a known in the art sensory evaluation The liquid resistance is typically provided by the classification as Type 3 being superior to Type 4 being superior to Type 6. TY8 is a Type 3.

Overall the example exhibits a good mechanical resistance, an acceptable breathability and comfort, and a suitable liquid resistance (Type 3). Therefore, the example is the only product which meets all the objectives of the invention.

Comparative Example A

SPCL is a product of Honeywell Safety Products, Paris, France, made of 3 PE layers of a total thickness of 100 microns.

The main properties of SPCL are provided in the table 2 below:

TABLE 2

| Test | Result | Unit |
|---|---|---|
| Basis weight of laminate | 92 | g/m² |
| Thickness of laminate | 100 | microns |
| MD Tensile | 67 | N |
| CD Tensile | 35 | N |
| Hydrostatic Head | >300* | cm of water |
| Moisture Vapor Transmission Rate | 64 | g/m² · day |

The breathability of SPCL was measured according to EN 31092/ISO 11092, which typically provides the measurement procedure to assess the Ret, the resistance to evaporative heat loss through the sample which is expressed in $m^2 \cdot Pa/W$. The breathability was 251 $m^2 \cdot Pa/W$. The higher the Ret value is, the worst the breathability. Hohenstein Comfort Rating System indicates that breathable fabrics are the ones with a Ret below 30 $m^2 \cdot Pa/W$. As a consequence, SPCL does not provide a satisfactory level of comfort to the wearer because of the risk of heat stress.

The liquid resistance is typically provided by the classification as Type 3 being superior to Type 4 being superior to Type 6. SPCL is certified as a Type 3.

Overall SPCL exhibits no breathability and a poor comfort but a suitable liquid resistance (Type 3).

Comparative Example B

MCG23 is a Microgard Deutschland GmbH product, made of a PE coated bicomponent PP/PE spunbond nonwoven.

The main properties of MCG23 are provided in the table 3 below:

TABLE 3

| Test | Result | Unit |
|---|---|---|
| Basis weight of laminate | 64 | g/m² |
| Thickness of laminate | 200 | microns |
| MD Tensile | 143 | N |
| CD Tensile | 74 | N |
| Hydrostatic Head | 180 | cm of water |
| Moisture Vapor Transmission Rate | 40 | g/m² · day |

Due to its composition, a PE coated spunbond nonwovens, the MCG23 is not breathable when converted into a coverall as demonstrated by the very low MVTR value of 40 g/m²·day of water vapor going through the fabric, and, as a consequence, it does not provide a satisfactory level of comfort to the wearer because of the risk of heat stress.

The liquid resistance is typically provided by the classification as Type 3 being superior to Type 4 being superior to Type 6. MCG23 is certified as a Type 3.

Overall MCG23 exhibits no breathability but a suitable liquid resistance (Type 3).

Comparative Example C

M45 is a 3M Occupational Health & Safety Division EMEA Region product, made of a laminate between a nonwoven and a PE non-microporous film.

The main properties of M45 are provided in the table 4 below:

TABLE 4

| Test | Result | Unit |
|---|---|---|
| Basis weight of laminate | 50 | g/m² |
| Thickness of laminate | 142 | microns |
| MD Tensile | 90 | N |
| CD Tensile | 39 | N |
| Hydrostatic Head | 180 | cm of water |
| Moisture Vapor Transmission Rate | 46 | g/m² · day |

From a comfort point of view, the M45 material provides no breathability as demonstrated by the very low MVTR value of 46 g/m²·day of water vapor going through the fabric. As a consequence, it does not provide a satisfactory level of comfort to the wearer because of the risk of heat stress.

The liquid resistance is typically provided by the classification as Type 3 being superior to Type 4 being superior to Type 6. M45 is a Type 4.

Overall M45 exhibits no breathability and a low liquid resistance (Type 4).

Comparative Example D

KC71 is a product of Kimberly Clark Europe Ltd., made of a PP spunbond nonwoven with a barrier film coating.

The main properties of KC71 are provided in the table 5 below:

TABLE 5

| Test | Result | Unit |
|---|---|---|
| Basis weight of laminate | 89 | g/m² |
| Thickness of laminate | 279 | microns |
| MD Tensile | 95 | N |
| CD Tensile | 96 | N |
| Hydrostatic Head | (>)300* | cm of water |
| Moisture Vapor Transmission Rate | 89 | g/m² · day. |

*

Due to its composition, a barrier film coated on a spunbond nonwovens, the KC71 is a not breathable coverall, as shown by the very low MVTR value of 89 g/m²·day, which, as a consequence, does not provide a satisfactory level of comfort to the wearer because of the risk of heat stress.

The liquid resistance is typically provided by the classification as Type 3 being superior to Type 4 being superior to Type 6. KC71 is a Type 3.

Overall KC71 exhibits no breathability but a suitable liquid resistance (Type 3).

We claim:

1. A laminated structure consisting of a microporous film bonded in a face to face relationship with a plexifilamentary nonwoven web with an adhesive layer situated in contact with a least a portion of both the microporous film and the nonwoven web, wherein;

the film contains filler consisting of calcium carbonate, clay, titanium dioxide, barium sulfate or any combination thereof in an amount between 30% and 50% by weight of the total film weight, and between 40% and 90% of polyolefin polymer by weight of the total film weight, the film has a thickness of between 12 and 25 microns, the film is bonded to the plexifilamentary web by adhesive, the laminated structure has a water vapor transmission rate (WVTR) as measured by the EN ISO 12572 Climate C method of greater than or equal to 1000 g/m2/day, the basis weight of the laminated structure is at least 55 g/m2, the tensile strength of the laminated structure according to EN ISO 13934-1 is at least 35 Newtons in the machine direction, the tensile elongation of the laminated structure according to EN ISO 13934-1 is at least 8% in the machine direction, the tensile strength of the laminated structure according to EN ISO 13934-1 is at least 35 Newtons in the cross direction, the tensile elongation according to EN ISO 13934-1 is at least 15% in the cross direction, and the laminated structure has a hydrohead according to EN 20811 of at least 200 cm of water.

2. The structure of claim 1 in which the adhesive is located at multiple discrete points on the plexifilamentary web.

3. The structure of claim 2 in which the adhesive comprises carbon based powders, micro-powders, nanotubes and carbon fiber fragment components, or any combination thereof.

4. The structure of claim 2 in which the adhesive comprises reactive tracers.

5. The structure of claim 1 in which the polyolefin polymer is selected from the group consisting of LDPE, LLDPE, HDPE, PP, and any combination thereof.

6. A protective garment comprising the structure of claim 1.

* * * * *